United States Patent
Love et al.

(10) Patent No.: US 7,075,887 B2
(45) Date of Patent: Jul. 11, 2006

(54) MEASURING EFFICIENCY OF DATA TRANSMISSION

(75) Inventors: Simon Love, Edinburgh (GB); David Archibald, Midlothian (GB)

(73) Assignee: Agilent Technologies, Inc., Palo Alto, CA (US)

( * ) Notice: Subject to any disclaimer, the term of this patent is extended or adjusted under 35 U.S.C. 154(b) by 944 days.

(21) Appl. No.: 09/735,607

(22) Filed: Dec. 14, 2000

(65) Prior Publication Data

US 2001/0050901 A1    Dec. 13, 2001

(30) Foreign Application Priority Data

Dec. 24, 1999   (GB) .................................. 9930618.5

(51) Int. Cl.
*H04L 1/18* (2006.01)

(52) U.S. Cl. ...................... 370/218; 370/242; 370/244; 370/252; 370/394; 714/748

(58) Field of Classification Search ................ 370/218, 370/231, 242, 243, 244, 245, 389, 394, 395.52, 370/252; 714/746, 748, 750, 749
See application file for complete search history.

(56) References Cited

U.S. PATENT DOCUMENTS

| | | | |
|---|---|---|---|
| 5,151,899 A | | 9/1992 | Harvey ........................ 370/394 |
| 5,528,595 A | * | 6/1996 | Walsh et al. ................ 370/402 |
| 6,049,902 A | * | 4/2000 | Davis et al. ................ 714/748 |
| 6,389,016 B1 | * | 5/2002 | Sabaa et al. ................ 370/389 |
| 6,424,625 B1 | * | 7/2002 | Larsson et al. ............. 370/236 |
| 6,563,821 B1 | * | 5/2003 | Hong et al. ................. 370/389 |
| 6,629,151 B1 | * | 9/2003 | Bahl .......................... 709/250 |

FOREIGN PATENT DOCUMENTS

| | | |
|---|---|---|
| EP | 0570220 A2 | 5/1993 |
| EP | 0825738 A2 | 8/1997 |
| GB | 2330737 A | 10/1997 |
| WO | WO 98/49796 | 4/1997 |

OTHER PUBLICATIONS

Saitoh, T et al: "Network congestion monitoring and detection using the IMU infrastructure" Parallel Processing. 1999. Proceedings. 1999 International Conference on AIZU-Wakamatsu City, Japan. Sep. 21-24, 1999. Los Alamitos CA USA, IEEE Comput. Soc. US. Sep. 21, 1999. pp. 426-469 XP010354907.

* cited by examiner

*Primary Examiner*—Dang Ton
*Assistant Examiner*—Shick Hom

(57) ABSTRACT

Retransmission of packets in a TCP network is measured by monitoring packets traversing bearer links between nodes and examining the sequence number within its connection of each packet. For each TCP connection being monitored a next expected sequence number (NESN) value is maintained and compared with the actual sequence number of a packet in that connection. If the sequence number is less than the NESN, a retransmission count is incremented by the size of the retransmitted TCP payload; if it is greater than the NESN, a loss counter is incremented by the size of the lost TCP payload. The resulting counts of the lost and retransmitted TCP payload, of the lost and retransmitted packets, enable accurate measurements to be made even at a point remote from the sending node. Comparison of counts from spaced points in a network can enable the location of a fault to be determined at least approximately.

18 Claims, 2 Drawing Sheets

MEASURING EFFICIENCY OF DATA TRANSMISSION

TECHNICAL FIELD

This invention relates to measurement of the efficiency of data transmission, in particular in networks in which data packets have sequence numbers and sending stations retransmit packets which are deemed to be lost. One example of a network protocol with these characteristics is the Transmission Control Protocol (TCP) used to implement end-to-end transfer of data packets with error and congestion control. TCP is often used in conjunction with the Internet Protocol (IP) which implements basic packet assembly and routing.

BACKGROUND ART

One way of measuring the efficiency of a TCP connection is by measuring how much of the traffic that is sent as part of the connection is retransmitted. Retransmissions occur when the sending node does not receive an acknowledgement, within a predetermined time interval, of receipt of a packet at the receiving node. This can be due to either loss or delay of either the original packet or the acknowledgement.

Each TCP packet is accompanied by a sequence number (the packet's position in the sending node's output buffer, measured in bytes from the beginning of the buffer plus a random offset which is chosen at the start of a connection to avoid simultaneous use of duplicate sequence number values). A TCP length (the amount of TCP payload data transferred) can also be calculated for each TCP packet, by subtracting the IP and TCP header lengths from the total length of the overall IP packet. By recording the first and last sequence numbers for each direction of a TCP connection it is possible to calculate the amount of traffic successfully transmitted as part of the connection. This is accomplished by subtracting the first sequence number from the last, making an allowance for signalling packets such as SYN (synchronise sequence numbers) and FIN (data transfer finished) which increment the sequence number without transmitting any payload. The resulting measurement of total transmitted traffic is referred to herein as "goodput".

One conventional way to measure TCP retransmission is to measure the volume of transmitted TCP payload (i.e. the aggregate of all TCP packets including both original and retransmitted packets), by summing the TCP packet lengths, and then subtract the TCP goodput. When this measurement is made at the location of the sending TCP node it produces an accurate measure of the retransmissions, as the measure of the total transmitted volume is indeed the actual volume—none has yet been lost.

However if the measurement is made at a point where some of the IP packets may have already been lost then the retransmission measurement will undercount by the amount of the loss. In the case where the retransmissions are due to loss of data packets (as opposed to delay or loss of acknowledgements) then this loss can mask out the retransmissions and give the connection a flatteringly low retransmission count.

DISCLOSURE OF INVENTION

According to one aspect of this invention there is provided a method of measuring the efficiency of data transmission in a network in which data packets have sequence numbers and sending stations retransmit packets which are deemed to be lost, comprising the steps of:

monitoring the occurrence of packets at a point in the network;

tracking the sequence numbers of successively monitored packets;

attributing a sequence number less than the next expected number to retransmission of a packet and incrementing a retransmission count in accordance with the quantity of retransmitted data; and reporting the retransmission count as indicative of the transmission efficiency.

This technique enables an observer at an arbitrary monitoring point on a TCP connection to estimate the traffic that was originally sent by the transmitting TCP node, even though some of this traffic is missing by the time it is seen at the monitoring point. This makes the TCP retransmission measurement less susceptible to distortion due to packet loss that occurs between the sender and the probe at the monitoring point.

According to another aspect of this invention there is provided a method of monitoring data transmission in a network in which data packets have sequence numbers and sending stations retransmit packets which are deemed to be lost, comprising the steps of:

monitoring the occurrence of packets at a point in the network;

tracking the sequence numbers of successively monitored packets;

attributing a sequence number greater than the next expected number to loss of at least one packet and incrementing a loss count in accordance with the quantity of retransmitted data; and reporting the loss count as indicative of the transmission quality.

BRIEF DESCRIPTION OF DRAWINGS

A method and apparatus in accordance with this invention, for measuring efficiency of data transmission in a network using TCP, will now be described, by way of example, with reference to the accompanying drawings, in which.

BEST MODE FOR CARRYING OUT THE INVENTION, & INDUSTRIAL APPLICABILITY

Figure 1:
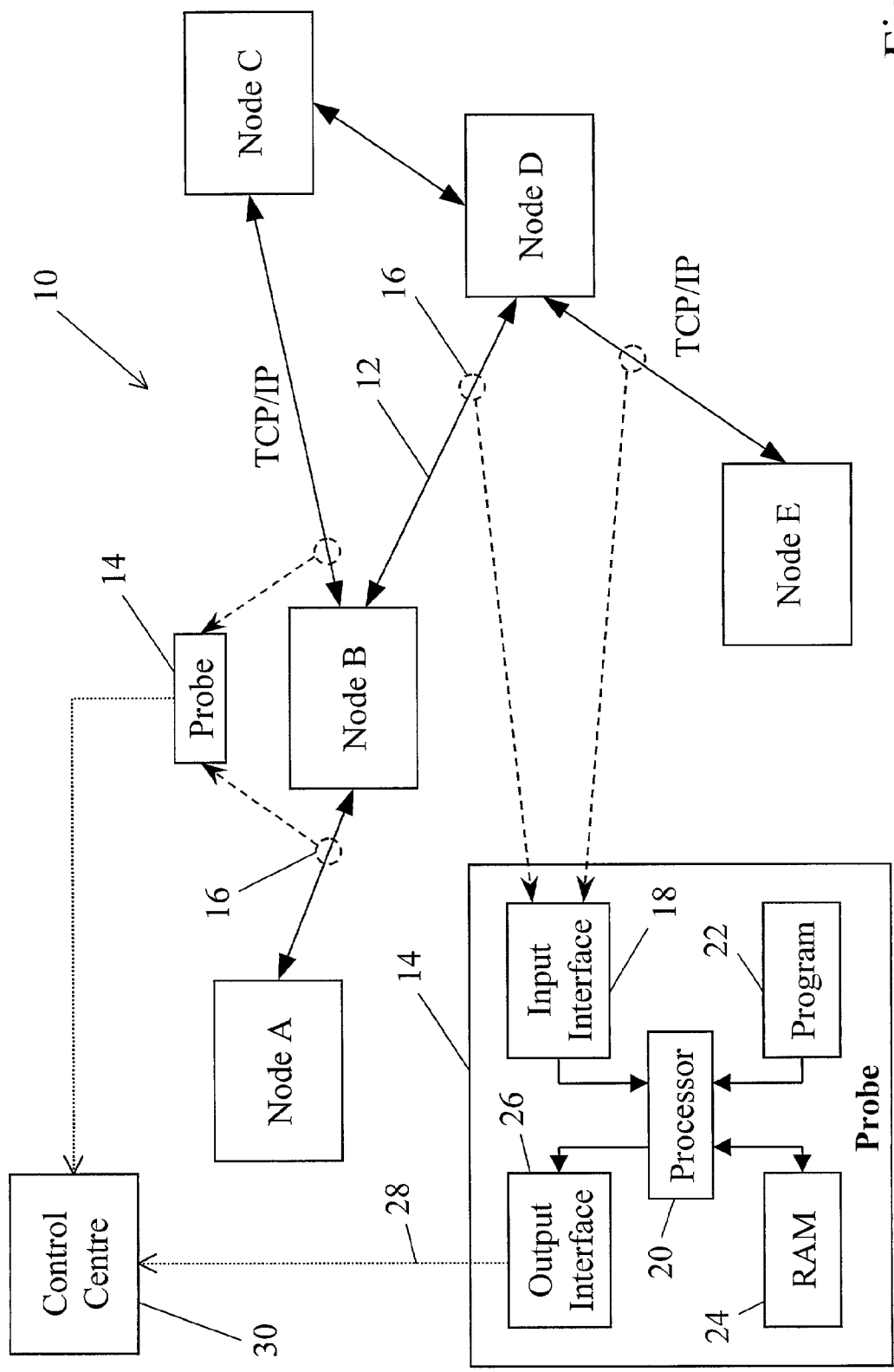
FIG. 1 is a schematic illustration of a TCP data transmission network.

Referring to FIG. 1, a TCP data transmission network 10 comprises several nodes A, B, C, D and E connected by bearer transmission links such as at 12. Each node may contain one or both of end-station (transmitter/receiver) functionality and store-and-forward (router) functionality. The bearer links 12 may use, for example, electrical or optical data transmission technology. When data are to be transferred between end stations (such as the nodes A and E), a TCP connection is created between the two end stations using a handshaking process initiated by a packet containing a SYN flag. As described in the Internet Engineering Task Force's RFC 793, for example, an initial sequence number is agreed between the end stations as part of this process. The data are assembled into packets at node A and transferred in accordance with TCP over the bearer links 12 from node A to node B, node B to node D, and finally node D to node E. Packets are routed from node to node dynamically, depending on current operational conditions such as the traffic load on different links. For example, packets may be transferred between nodes B and D directly, or via node C, and the routing may differ for successive packets relating to the same connection. Accordingly packets may arrive at node E in a different order from that in which they were transmitted. To cater for this successively transmitted packets are assigned successive sequence numbers by node A, starting from the agreed initial value. Node E acknowledges each packet it receives relating to that connection, and uses the sequence numbers to re-order them as necessary and to check that no packets are missing. If node A does not receive an acknowledgement of a particular packet within a predetermined time (either because the packet never reached node E, so no acknowledgement was sent, or because the acknowledgement itself was lost), it automatically retransmits the packet.

This packet retransmission is an important feature in providing a robust data transmission system, but it also results in reduction in efficiency of use of the network. Frequent retransmission of packets by a particular node or within a segment of the network can be indicative of an operational problem which should be investigated and resolved. Therefore it is advantageous to monitor the level of packet retransmission.

To this end, in accordance with this invention, probes 14 are provided for passively monitoring selected bearer links 12. The monitoring is passive in the sense that the operation of the links 12 is undisturbed by the presence of the probes 14, which simply make copies of some or all of the packets they observe traversing the links. The probes 14 are coupled to the links 12 via interfaces 16 in such a way that the operating characteristics of the links 12 are not altered. In the case of optical links, for example, the interfaces 16 may comprise optical power splitters; for electrical links they may be bridging isolators, or in the case of an Ethernet network LAN taps may be used.

Each probe 14 has an input interface 18 which receives and conditions the signal received from the optical power splitter interface 16 and supplies it to a processor 20 operating under the control of software program instructions in a program store 22. Before storing a packet extracted from the signal in a random access store 24 the processor 20 may perform some initial processing (e.g. error checking, preliminary decoding, and identification of the specific TCP connection to which the packet belongs using the IP addresses and port numbers of the end-points identified in the packet header). The stored packets, or summary data derived from analysis of them performed by the processor 20, are subsequently forwarded via an output interface 26 and a communications link 28 (e.g. a local area network) to a control centre 30 for further analysis as necessary and display of the results. The probes 14 may comprise for example J3754C Internet Advisor units available from Agilent Technologies.

The analysis carried out by the probes 14 and/or the control centre 30 handles two distinct cases:

Case 1. Looking for 'Gaps'

In this case the sequence numbers are followed for each distinct TCP connection being monitored so that the expected sequence number of the next packet in a specific connection is known. If the next packet for a connection actually has a higher-value sequence number then is expected it is assumed that loss of the intermediate packet(s) has occurred and a loss counter is incremented by the difference. The aggregate loss measurement (gaps) can be added to the measured apparent volume of traffic, before deducting the goodput measurement, to yield a more accurate measurement of retransmissions. It is possible that if repeated loss of the same packet occurs it might be counted as lost only once.

Case 2. Detecting Retransmissions

As in case 1 the sequence numbers are followed for each distinct TCP connection, so the expected sequence number of the next packet for each connection is known. If a packet is detected with a sequence number preceding the expected sequence number then it is assumed that this occurrence of the packet is in fact a retransmission. With this technique the retransmissions are measured directly, irrespective of whether or not the original packet transmission has been detected.

Both case 1 and 2 involve following the chronological sequence of the packets as they arrive at a probe 14 and making deductions about the traffic that was actually sent. It is only required to monitor packet traffic in a single direction (it is not necessary to monitor the acknowledgements passing in the other direction).

As noted above, IP traffic is not guaranteed to arrive in order of transmission, owing to the way in which it may be dynamically routed through the network (routes can change etc.). However, in the case of TCP traffic being carried over a Virtual Connection, such as an Asynchronous Transfer Mode (ATM) Permanent Virtual Channel (PVC) or Switched Virtual Channel (SVC), which is not subject to IP routing, it can be assumed that the traffic is being detected in the order in which it was transmitted. The same assumption can be made when the packets are being carried by a connection-oriented protocol such as the Point-to-Point Protocol (PPP), which is designed to carry IP traffic over a serial link.

Even in the case of a network where the transit path is not fixed and the packet order therefore cannot be assumed, these measurement techniques can still be applied at the transmission end.

Figure 2:
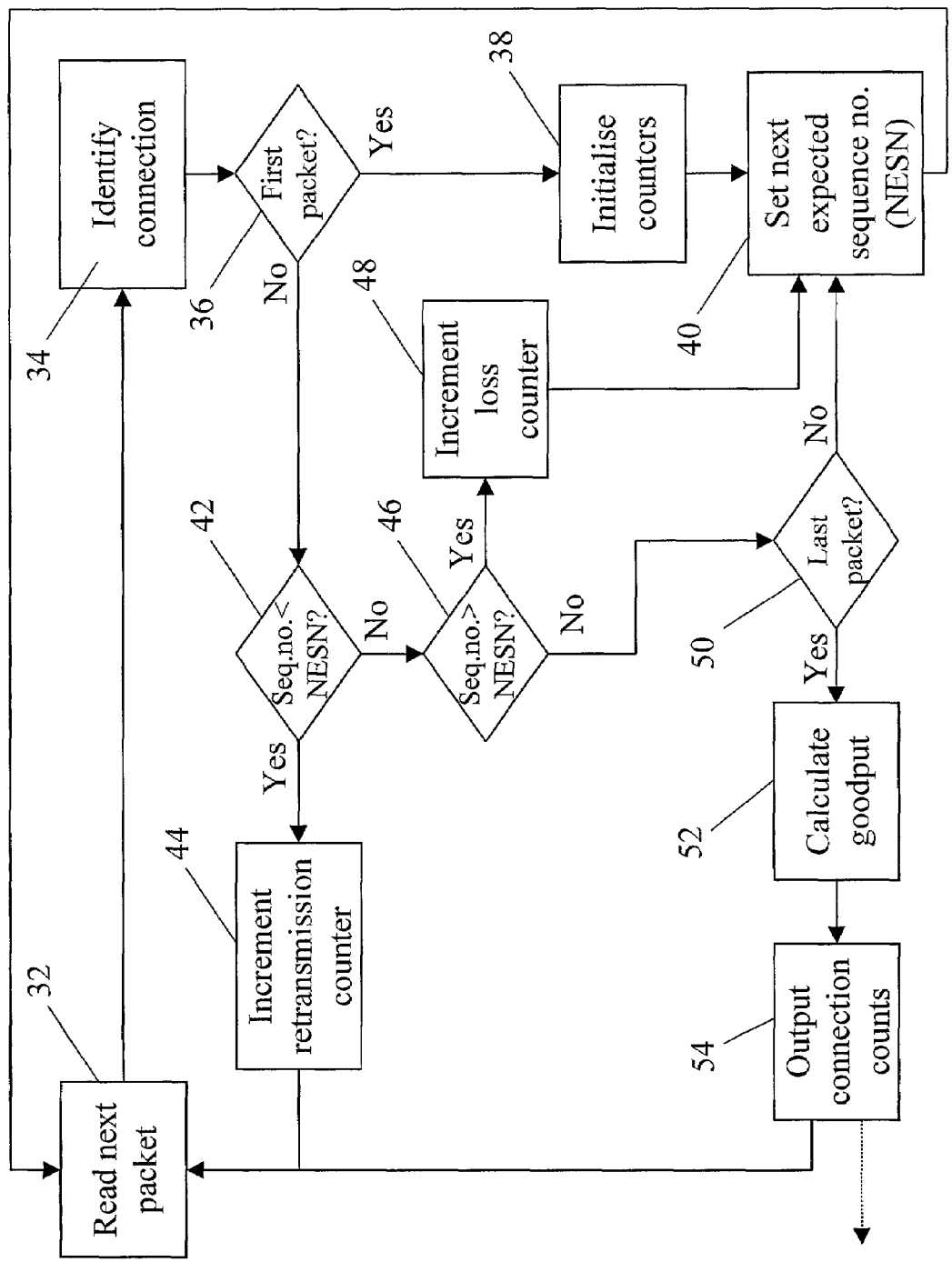
FIG. 2 is a flow diagram of a procedure for implementing the invention.

FIG. 2 shows the steps involved in a procedure for implementing an analysis in accordance with the invention. The procedure involves following the state of any required subset of the connections being carried by a monitored bearer link 12, by identifying each packet associated with each connection in that sub-set. The sub-set can be defined in terms of combinations of IP addresses, end-station ports and protocols. By keeping track of the next expected sequence number (NESN) for each connection and comparing it with the actual sequence number of the next packet that arrives for a connection, it is possible to identify whether the packet is part of the normal packet sequence, whether it is a retransmission or whether there has been a gap owing to loss of a packet.

Referring to FIG. 2, each packet received on a bearer link 12 is read at step 32, and the connection to which it relates is identified at step 34 by reference to the relevant information in the packet's header. At step 36 the connection identity is examined to determine whether this is the first packet encountered for this connection (for example by reference to a look-up table of connections already encountered and being monitored). If not, the procedure continues to step 38 to initialise retransmission and loss counters for this new connection (possible after determining whether the connection belongs to a sub-set which has been previously specified to be monitored). Thereafter the procedure sets the NESN value at step 40, by reference to the sequence number in the packet currently being examined, before returning to step 32 to read the next packet.

If the test at step 36 concludes that the connection to which the current packet relates has already been encountered the procedure advances to step 42, where the sequence number of the packet is compared to the NESN. If the sequence number is less than the NESN then an instance of case 2 above is diagnosed, and the packet is treated as a retransmission of a packet sent previously. Accordingly at step 44 the retransmission counter is incremented in accordance with the quantity of retransmitted data, that is in a TCP network by the size of the retransmitted TCP payload, and the procedure then returns to step 32 for the following packet.

In the test at step 42 establishes that the sequence number of the current packet is not less than the NESN, the procedure advances to step 46 to test whether the sequence number is greater than the NESN. If it is greater an instance of case 1 described above is taken to have occurred, and the loss counter is incremented by the lost TCP payload at step 48. Because the packet with the NESN is assumed to be lost and therefore will not be encountered, the NESN must then be updated at step 40 (by setting it to the new NESN) before the next packet received is read at step 32.

If the test at step 46 yields a negative result (i.e. the packet sequence number is equal to the NESN) then a normal packet sequence has been confirmed. At step 50 a test is made for whether this packet is the last packet in its connection (by reference to information in the packet header). If not the procedure updates the NESN at step 40 before returning to step 32. When the test at step 50 determines that the last packet for the connection has been encountered, the goodput is calculated at step 52, as described earlier, by subtracting the first sequence number for the connection from the last and making an allowance for signalling packets which affect the sequence number but do not convey any payload. Then the retransmission and loss counts and the goodput value for the connection are output at step 54 (for example, to the control centre 30). Thereafter the look-up table of connections being monitored is updated to remove this connection, and the procedure returns to step 32 to read another packet.

The results output at step 54 enable more accurate measurements to be made than has hitherto been the case for retransmissions of packets in a connection, without having to monitor at the sending node itself. The retransmission count RTx and the goodput value can be combined to yield a measure TCPvol of the total volume of TCP traffic that was originally transmitted for the relevant connection:

$$TCPvol = RTx + Goodput$$

which is much less vulnerable to distortion caused by packet loss than is the case with conventional methods of measuring retransmission.

Another way of deriving the total volume TCPvol is possible if an additional count is obtained of the total TCP payload of the packets observed. This may be done in the procedure shown in FIG. 2 by initialising an extra counter for total packets at step 38 to have a value equal to the size of the TCP payload of that first packet. This counter is incremented by the TCP payload in respect of subsequent packets between the tests at steps 36 and 42. The resulting total count TCPObservedTtl of the payload in the packets actually observed is output at step 54, and can be combined with the loss count from step 48 to produce a total volume value according to the relationship:

$$TCPvol = Loss + TCPObservedTtl$$

Because of the way in which the loss count is derived in the procedure of FIG. 2, this value for TCPvol is also less vulnerable than conventional methods to distortion by packet loss.

By comparing the loss count to the retransmission count it is possible to assess whether a fault resulting in retransmissions is located before or after the probe along the route of packet transmission, as the loss count is indicative of loss of packets occurring between the transmission location and the location of the probe, whereas the retransmission count is a more global indicator of activity in the network. Accordingly, comparing such results from probes at several different points enables determination to at least some degree of the actual location of a fault.

The invention claimed is:

1. A method of measuring the efficiency of data transmission in a network in which data packets have sequence numbers and sending stations retransmit packets which are deemed to be lost, comprising:
    monitoring the occurrence of packets at a point in the network;
    tracking the sequence numbers of packets successively monitored at the point;
    detecting occurrence of a sequence number less than a next expected sequence number as being indicative of occurrence of packet retransmission;
    incrementing a retransmission count in accordance with the quantity of retransmitted data;
    reporting the retransmission count as indicative of the transmission efficiency; and
    deriving a measure of total volume of packets transmitted as a function of the retransmission count.

2. The method of claim 1, wherein the network uses TCP.

3. The method of claim 2, wherein TCP traffic in the network at the monitored point is coherent TCP traffic which traverses the monitored point in the order of packet transmission.

4. The method of claim 1, further including selecting at least one specific connection for monitoring by reference to at least one of (a) an IP address of a connection end-point, (b,) a port at an end-point, and (c) a protocol.

5. The method of claim 1, further including detecting occurrence of a sequence number greater than the next expected number as being indicative of loss of a packet incrementing a loss count by the size of a lost TCP payload, and determining the location of a fault relative to the location of the monitoring point by using the loss count.

6. The method of claim 5, further including determining the location of the fault by comparing counts obtained from different monitoring points.

7. A method of monitoring data transmission in a network in which data packets have sequence numbers and sending stations retransmit packets which are deemed to be lost comprising:
    monitoring the occurrence of packets at a point in the network;
    tracking the sequence numbers of packets successively monitored at the point;
    detecting occurrence of a sequence number greater than a next expected sequence number as being indicative of occurrence of packet loss at the point;

incrementing a loss count in accordance with the quantity of lost data at the point;

reporting the loss count as indicative of the transmission quality; and deriving a measure of total volume of packets transmitted as a function of the loss count.

8. The method of claim 7, wherein at least one specific connection is selected for monitoring by reference to at least one of (a) an IP address of a connection end-point, (b) a port at an end-point, and (c) a protocol.

9. The method of claim 7, further including determining the location of a fault relative to the location of the monitoring point by using the loss count.

10. The method of claim 9, further including determining the location of the fault by comparing counts obtained from different monitoring points of the network.

11. Apparatus for measuring the efficiency of data transmission in a network in which data packets have sequence numbers and sending stations retransmit packets which are deemed to be lost, comprising a processor arrangement arranged to:

monitor the occurrence of packets at a point in the network;

track the sequence numbers of packets successively monitored at the point;

detect occurrence of a sequence number less than a next expected sequence number as being indicative of occurrence of packet retransmission;

increment a retransmission count in accordance with the quantity of retransmitted data;

report the retransmission count as indicative of the transmission efficiency; and derive a measure of total volume of packets transmitted as a function of the retransmission count.

12. The apparatus of claim 11, wherein the processor arrangement is arranged to detect occurrence of a sequence number greater than the next expected number as being indicative of loss of a packet, increment a loss count by the size of a lost TCP payload, and determine the location of a fault relative to the location of the monitoring point by using the loss count.

13. The apparatus of claim 12, wherein the processor arrangement is arranged to determine the location of the fault by comparing counts obtained from different monitoring points of the network.

14. The apparatus of claim 11, further including a monitor for the packets adapted to be coupled to the point.

15. Apparatus for measuring the efficiency of data transmission in a network in which data packets have sequence numbers and sending stations retransmit packets which are deemed to be lost, comprising a processor arrangement arranged to:

monitor the occurrence of packets at a point in the network;

track the sequence numbers of packets successively monitored at the point;

detect occurrence of a sequence number greater than a next expected sequence number as being indicative of occurrence of packet loss at the point;

increment a loss count in accordance with the quantity of lost data;

report the loss count as indicative of the transmission quality; and derive a measure of total volume of packets transmitted as a function of the loss count.

16. The apparatus of claim 15, wherein the processor arrangement is arranged to:

(a) detect occurrence of a sequence number greater than the next expected number as being indicative of loss of a packet, (b) increment a loss count by the size of a lost TCP payload, and (c) determine the location of a fault relative to the location of the monitoring point by using the loss count.

17. The apparatus of claim 16, wherein the processor arrangement is arranged to determine the location of the fault by comparing counts obtained from different monitoring points.

18. The apparatus of claim 15, further including a monitor for the packets adapted to be coupled to the point.

* * * * *